United States Patent [19]

Stanganelli et al.

[11] Patent Number: 4,592,580
[45] Date of Patent: Jun. 3, 1986

[54] BUMPER CUSHION

[76] Inventors: Dominick Stanganelli, 2110 Campus Dr., Clearwater, Fla. 33516; Guiseppe Oddo, 1571 Ambrosia Dr., Clearwater, Fla. 33546; Antonino Sirchia, 20 No. Hercules, Clearwater, Fla. 33575

[21] Appl. No.: 586,584

[22] Filed: Mar. 6, 1984

[51] Int. Cl.⁴ ............................................. B60R 19/02
[52] U.S. Cl. ................................... 293/136; 293/137; 267/33
[58] Field of Search ............... 293/120, 132, 135, 136, 293/137, 104; 267/33

[56] References Cited

U.S. PATENT DOCUMENTS

| | | | |
|---|---|---|---|
| 3,130,964 | 4/1964 | Johnson | 267/33 |
| 3,361,467 | 1/1968 | Ludwikowski | 293/137 |
| 3,856,613 | 12/1974 | Weller | 293/120 |

*Primary Examiner*—Robert R. Song
*Attorney, Agent, or Firm*—Joseph C. Mason; Herbert W. Larson

[57] ABSTRACT

A cushion to provide added impact resistance to front or back bumpers of passenger cars or light trucks. The cushion may be bolted to front or back standard bumpers and consists of two steel plates or rails about 4" wide, and ¼" thick separated by some 3". It may also be chrome plated for aesthetic reasons. The same rail is bolted to each respective bumper and the interspace between the rails includes steel coil springs approximately 4" apart, welded to and separating the two rails. Each spring is encapsulated with a heat resistant tape wrapping and the space outside the springs and between the rails is filled with shock-absorbing rubber or plastic material. The interior of each spring is accordingly free of the shock-absorbing material and can function as a coil spring without the inhibition of the resilient filling material.

5 Claims, 2 Drawing Figures

BUMPER CUSHION

This invention is particularly applicable to providing bumpers on passenger cars and light trucks with additional cushioning capacity. The standard bumper is usually a more or less rigid metal bar attached directly to the chassis of the automobile. Such bumpers have sometimes been provided with additional cushioning material on the impacting surfaces. This is the field wherein the instant invention seeks to provide a superior cushion. The device of the invention includes helical coil springs in combination with resilient shock absorbing material in the cushioning shock absorbing device which may be attached to an automobile and becomes its standard bumper. The springs are securely fastened, such as by welding, between front and back rails to maintain them parallel. The resilient shock absorbing material fills the interspring space so that the front rail together with the rest of the cushion looks like any normal bumper, and may be chrome plated for aesthetic reasons.

Figure 1:
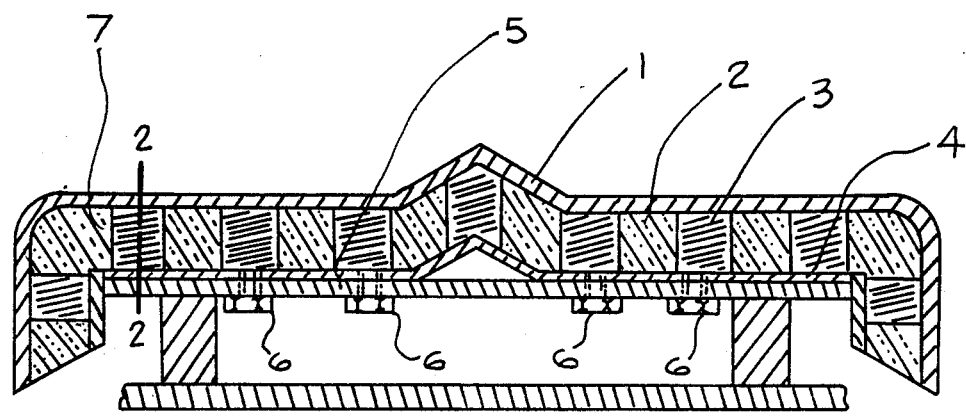
FIG. 1 is a longitudinal section of the bumper cushion.
Figure 2:
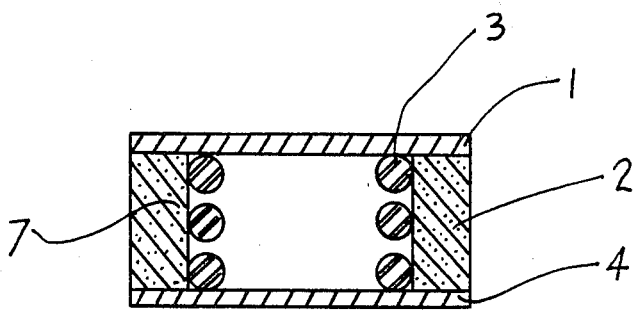
FIG. 2 is a cross section on the line 2—2 of FIG. 1.

As seen in FIG. 1, the cushion has a front plate or rail 1 comprising, for example, ¼ inch steel plate which may be about 4" in width, and a rear rail 4 of similar material which may be attached to the standard bumper 5 by any suitable means such as bolts or long screws 6 or may be attached to the chassis of the automobile by means well known in the art. The front rail 1 and the rear rail 4 are maintained in spaced parallel relationships by means of coil springs 3 and by means of the bolts or long screws 6, which are welded or otherwise securely fastened front and back to the rails 1 and 4.

The coil springs 3 are each encapsulated by a wrapping of a suitable flexible tape 7 to prevent encroachment within of the resilient shock absorbing material 2, which may be some form of polymerizable rubbery material, a framed plastic or other shock absorbing material, all of which are well known in the art.

The coil springs 3 are normally spaced about 3" apart and are about 2" in diameter and 3" long with 3.5" faces. The solidified resilient material fills all the interspace but does not penetrate to the inside of the encapsulated steel springs. Thus, the springs can react to impact without interference from the resilient material.

The strength of the coil springs is, of course, dependent on the weight of the vehicle involved and would be stronger for a heavier vehicle than for a small car.

It is important that the interior of the springs remain free of the resilient material 2 so that they can function uninhibited by the resilient material.

While resilient material has been used in the prior art in combination with steel springs, the force of an impact has been used in seriations through the resilient deformable material to the metal springs then to the chassis of the vehicle. This combination presents the possibility that the resilient deformable material may remain permanently deformed after the first impact. The in-parallel arrangement of the instant invention allows the coil springs 3 to return the resilient deformable material 2 to its original conformation after an impact.

The invention has been described with reference to a specific embodiment for use on passenger cars and light trucks; however, it will be understood that the device would be useful on stationary structures or wherever occasional impacts may be anticipated.

What is claimed is:

1. A shock absorbing bumper cushion comprising,
   an elongated substantially rigid backing rail adapted for fastening to a vehicle or structure to be protected,
   an impact absorbing substantially rigid front rail generally parallel to and spaced from said backing rail, said rails being maintained in generally parallel relationship by means of spaced resilient metal springs secured front and back to said backing and impact absorbing rails, the interspace between said rails being substantially filled with shock absorbing compressible resilient material, each of said spaced resilient springs being encapsulated in a wrapping of flexible tape to prevent encroachment of said compressible resilient material, whereby said springs may be compressed and relaxed on impact without interference from said shock absorbing compressible resilient material.

2. The device of claim 1 wherein said spaced resilient metal springs are helical coil springs.

3. The device of claim 1 wherein said shock absorbing compressible material is a polymerizable rubbery material.

4. The device of claim 1 wherein the shock absorbing compressible material is of formed plastic.

5. The device of claim 2 wherein said helical coil springs are welded, front and back to said front and backing rails.

* * * * *